United States Patent Office 2,843,252
Patented July 15, 1958

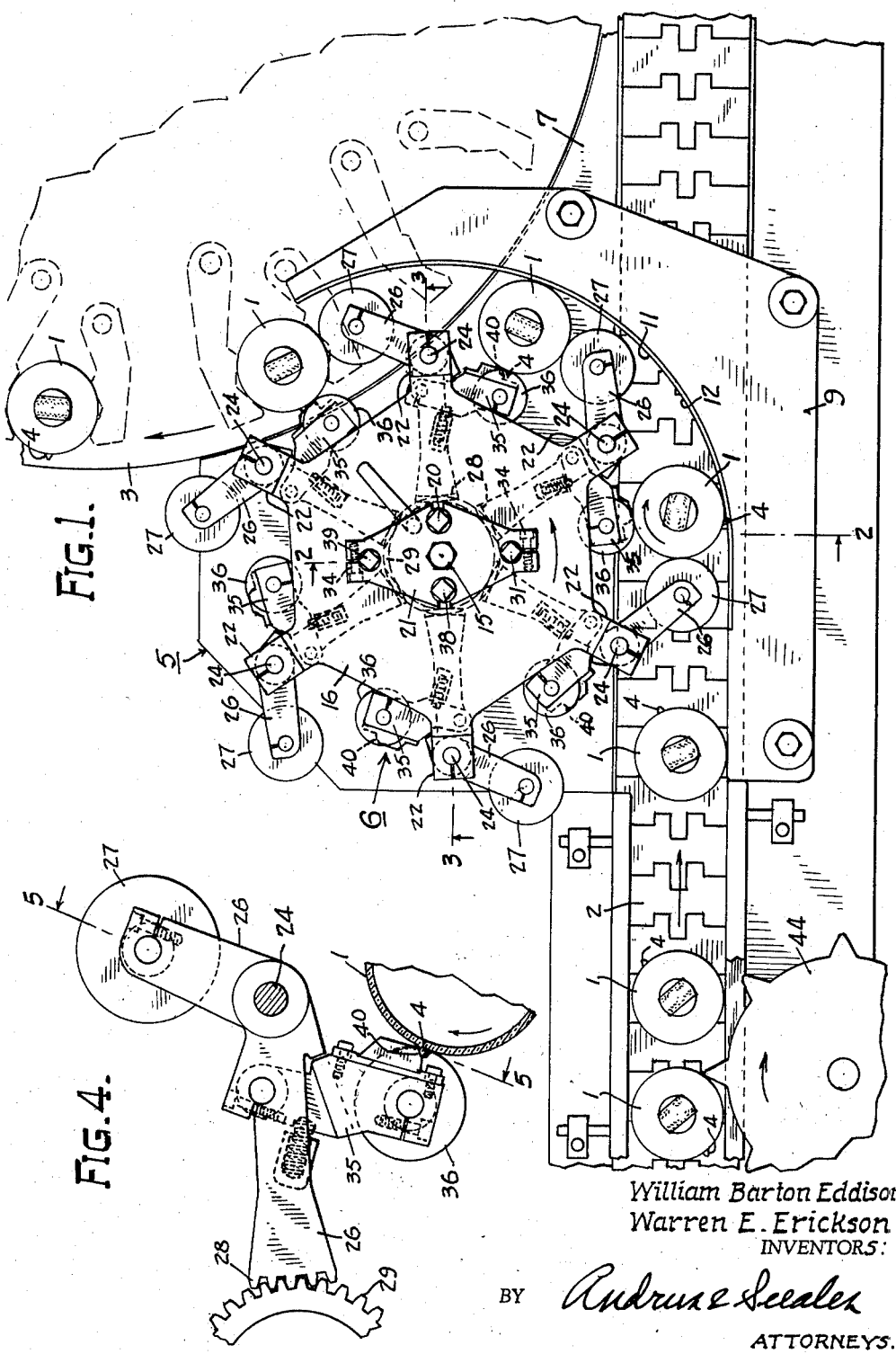
William Barton Eddison
Warren E. Erickson
INVENTORS
BY Andrus & Sceales
ATTORNEYS.

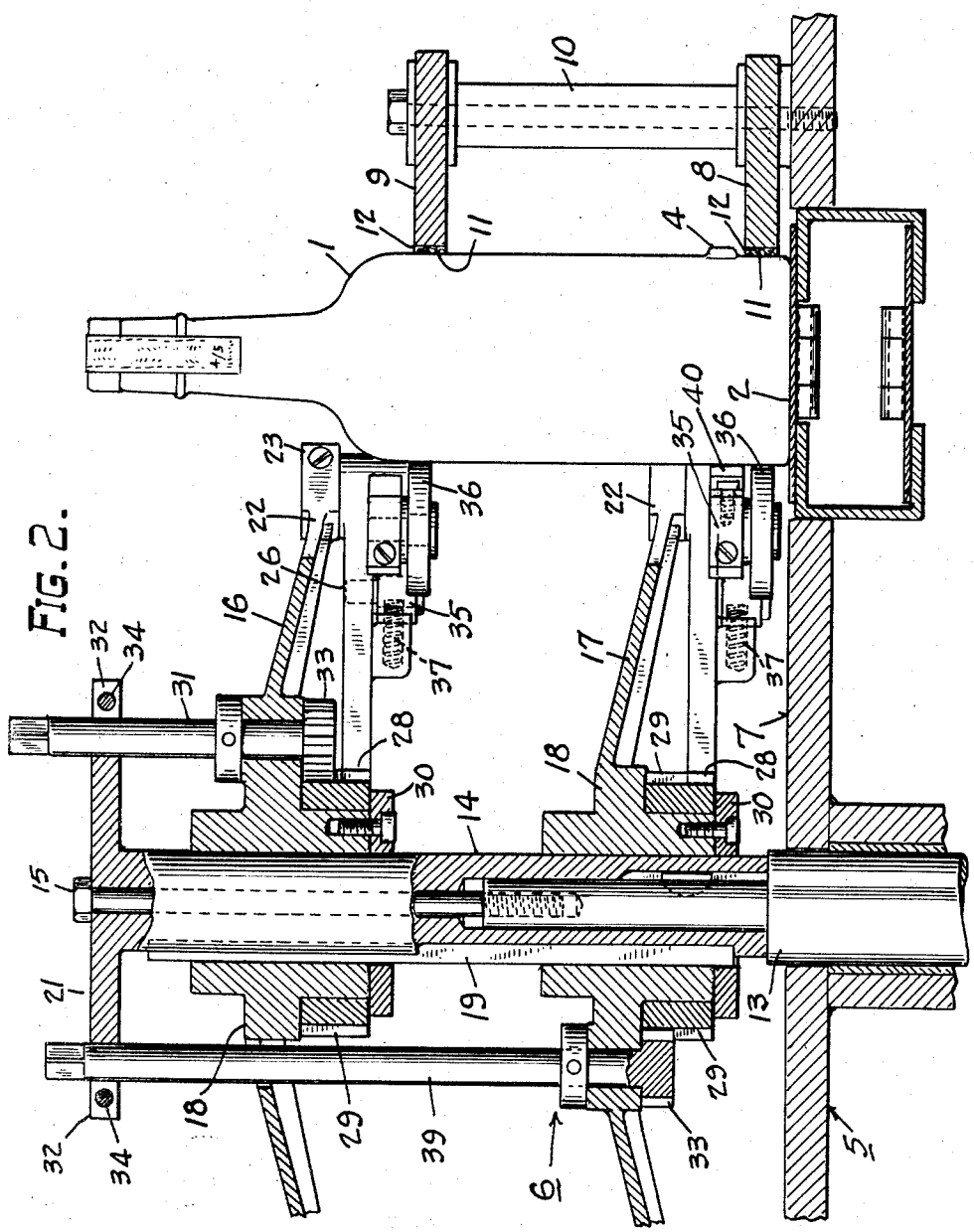

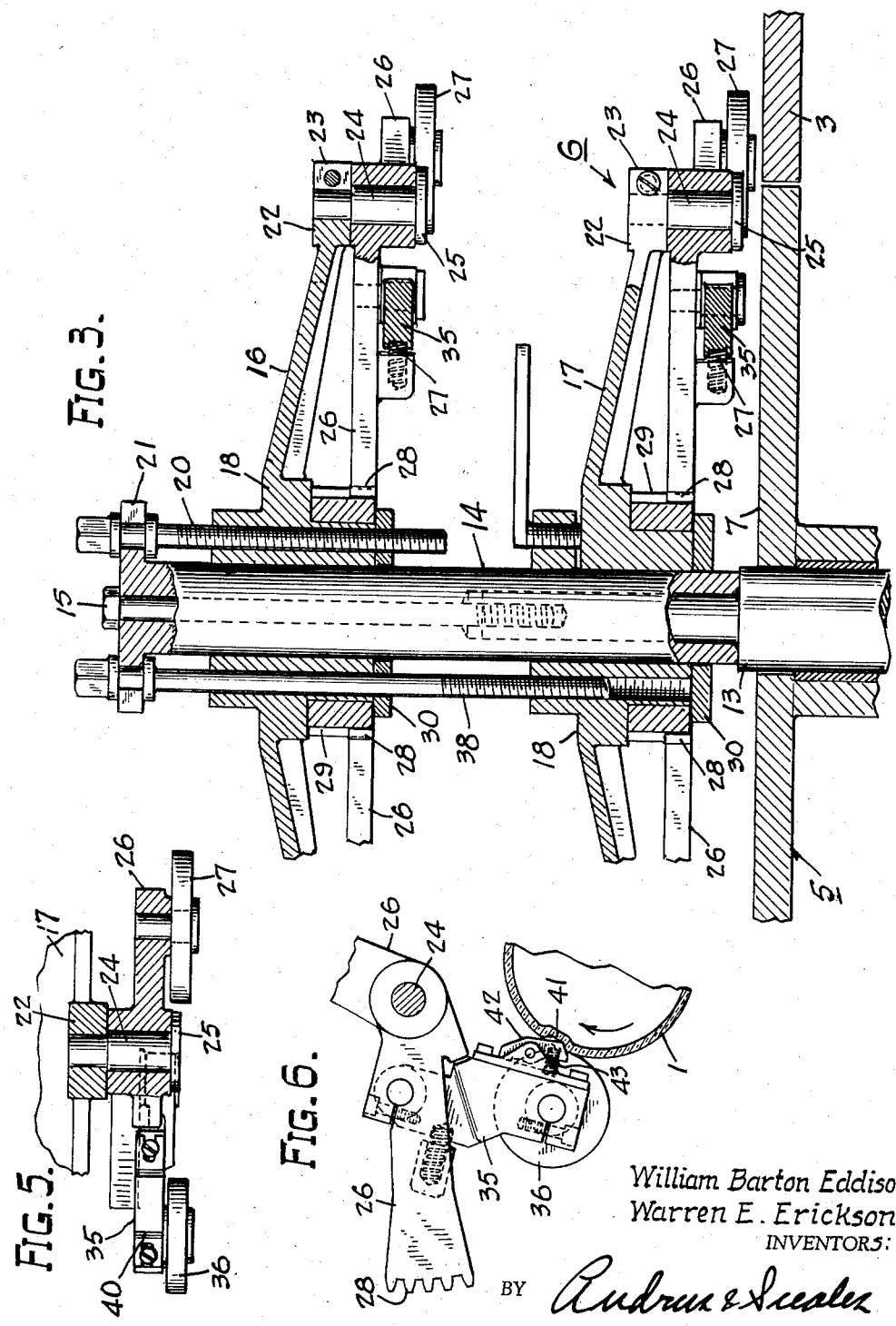

2,843,252
SPOTTING DEVICE

William Barton Eddison, Ardsley-on-Hudson, N. Y., and Warren E. Erickson, Madison, Wis., assignors to Gisholt Machine Company, Madison, Wis., a corporation of Wisconsin Application August 10, 1955, Serial No. 527,566

4 Claims. (Cl. 198—33)

This invention relates to a spotting device, and more particularly to a rotary apparatus for orienting the bottles of a moving stream of bottles or other objects prior to their entry into a turret type sealing or labeling machine.

In bottling or canning lines it is often desirable to index the containers to a particular predetermined angular position for the purpose of applying labels, government stamps, or the like. Heretofore, considerable difficulties have been encountered in indexing cylindrical objects. Bottling lines are necessarily run at high speed, and previous orientating systems utilizing a dwell or other non-constant rotary motion have often resulted in substantial bottle breakage. In addition, earlier spotters have not been sufficiently accurate in this operation and have failed to properly orientate a container from time to time in the line.

The present invention overcomes these and other difficulties and provides a constantly rotating spotting device which will operate at high speeds without damage to the containers. The spotter may be used in conjunction with a machine for applying tubular bands to bottle tops, such as that described and claimed in our co-pending United States application entitled "Machine for Applying Tubular Bands to Bottle Tops and the Like," Serial No. 416,184, filed March 15, 1954, and assigned to a common assignee herewith.

The accompanying drawings illustrate the best mode presently contemplated by the inventors for carrying out the invention.

In the drawings:

Figure 1 is a top plan view of the spotting device and adjacent conveyors;

Figure 2 is an enlarged vertical section taken on line 2—2 of Figure 1;

Figure 3 is an enlarged vertical section taken on line 3—3 of Figure 1 generally at right angles to Figure 2;

Figure 4 is an enlarged plan view of one of the roller and stop units showing the bottle indexed;

Figure 5 is a vertical section taken on line 5—5 of Figure 4; and

Figure 6 is a detail plan view similar to Figure 4 showing a modified construction for use with bottles having indexing indentations.

As shown in the drawings, the apparatus is adapted to be disposed in a bottling line and to receive cylindrical bottles 1 from a suitable conveyor 2 illustrated as an endless belt or chain type, and subsequently feed them to a second conveyor 3 which is illustrated as a rotary table of a sealing or labeling machine.

Bottles 1 are shown as being cylindrical and having a large diameter body which provides a suitable vertical bearing surface for rotation thereof and tapers gradually at the top into a neck of substantially less diameter. A spotting projection 4 is disposed on the exterior of the body of each bottle 1 near the lower end thereof. Projection 4 is adapted to be engaged by the mechanism of the spotting device for angular orientation in a manner to be described.

The spotter comprises, in general, a stationary frame 5 and a rotary indexing mechanism 6.

Frame 5 comprises a horizontal support or base plate 7 of metal or other material offering low frictional resistance to the passage of a container thereover. Plate 7 is supported by any suitable means, not shown, and is disposed between conveyors 2 and 3 and on a level therewith. A horizontal bearing plate 8 is spaced a short distance above base plate 7 and overlaps one portion thereof. A second bearing plate 9 is spaced above plate 8 and is parallel thereto. A plurality of posts 10 extend upwardly from base plate 7 and serve to space and secure the bearing plates.

Plates 8 and 9 are provided with concave arcuate edges 11 which begin over one conveyor and terminate over the other conveyor. Both edges 11 of plates 8 and 9 are shown as having identical curvatures and as being in vertical alignment to engage the vertical cylindrical outer surface of the body of the bottle. Plates 8 and 9 are preferably made of synthane or other suitable material.

Edges 11 are covered with leather 12 or other substance which has high wear resistance and which frictionally engages the bottles as they travel through the mechanism so that the bottles will be rotated by the edges prior to the actual spotting, but not subsequently.

The indexing mechanism 6 is mounted on a rotary vertical shaft 13 extending upwardly through base plate 7, and comprises, in general, a sleeve-like hub 14 supported on a shoulder of the shaft and keyed to the shaft to rotate therewith. A lock bolt 15 extends downwardly axially of sleeve 14 and is threaded into the upper end of shaft 13 to secure the sleeve thereon.

Two vertically spaced spiders 16 and 17 are adjustably mounted on sleeve 14 to rotate therewith. The upper spider 16 comprises a hub 18 vertically slidable on sleeve 14 and adapted to be rotated therewith by reason of the vertical spline key 19 on the sleeve.

Hub 18 is supported vertically by means of an adjustment bolt 20 extending downwardly from a flange 21 at the upper end of sleeve 14 and threaded into the hub. Turning of bolt 20 will thread the same in a corresponding direction relative to hub 18 and effect the desired vertical adjustment for the latter.

Hub 18 carries a suitable number, such as six, of equally spaced arms 22 extending radially therefrom.

Each arm 22 has a slit clamp 23 at its outer end for securing a vertical pin 24 therein. The pin 24 depends from arm 22 and has a flange 25 at its lower end for supporting a bellcrank lever 26 pivotally mounted on the pin.

The short arm of lever 26 extends outwardly and forwardly to carry a bottle pusher roller 27 of nylon or other suitable material that swings in behind a corresponding bottle on conveyor 2 and sweeps the same from the conveyor along the arcuate edges 11 and onto conveyor 3. The arcuate edges 11 are disposed concentric with the shaft 13.

The long arm of lever 26 extends inwardly toward hub 18 and has a gear segment 28 at its end meshing with a ring gear 29 rotatably mounted on the lower end of the hub. A support plate 30 is bolted to the end of hub 13 and serves to support the ring gear 29 for free rotation on the hub.

Adjustment of the position of roller 27 for different size bottles is provided by turning of the ring gear 29. For this purpose an adjustment shaft 31 extends downwardly through a split clamp 32 on flange 21 and loosely through hub 18. A gear pinion 33 is carried at the lower end of shaft 31 to mesh with ring gear 29. Clamp 32 is tightened by means of screw 34 to secure shaft 31 and gears 33 and 29 against turning after appropriate adjustment has been made.

The long arm of lever 26 pivotally carries a tensioning arm 35 which extends rearwardly from the arm relative to the direction of travel and carries a bottle engaging roller 36 of nylon or other suitable material at its outer end. A spring 37 disposed between lever 26 and arm 35 biases the latter radially outward from the center of shaft 13 to press a bottle 1 against the friction edges 11.

The lower spider 17 is mounted similar to upper spider 16. Both spiders 16 and 17 have the same construction and the several corresponding parts will carry the same numerals in the drawings.

Since the spider 17 is spaced farther from flange 21 the adjusting bolt 38 corresponding to bolt 20 will be longer than the latter and will pass downwardly loosely through an opening in the upper hub 18. Likewise the adjusting shaft 39 corresponding to shaft 31 will be longer than the latter.

Each tensioning arm 35 on the lower spider 17 carries a stop 40 which is adapted to ride adjacent the outer surface of the rotating bottle until it engages the index projection 4 as shown in Figure 4, whereupon it stops further rotation of the bottle and the latter is delivered to conveyor 3 properly orientated.

Where an index indentation 41 is employed on the bottles as shown in Figure 6, in place of projection 4, the stop 40 will be modified to provide a pivotal latch 42 carried by arm 35 and biased toward the bottle by a spring 43 so that as the outer end of latch 42 rides on the surface of the bottle as the latter rotates the latch will ultimately enter the indentation 41 and stop the bottle from further rotation.

Vertical adjustment of the lower spider 17 will align the stop 40 or latch 42 with the corresponding index projection 4 or indentation 41, as the case may be.

Operation of the spotting device is as follows:

Elevating bolts 20 and 38 and sizing bolts 31 and 39 are turned to properly position spiders 16 and 17 on sleeve 14 and to space rollers 27 and 36 to accommodate the particular shape and diameter of the bottles to be spotted.

Drive shaft 13 is then driven to drive mechanism 6 counterclockwise as shown in Figure 1. Bottles 1 are fed to the mechanism from conveyor 2, and may be spaced apart for entry into the spotter by means of a suitable metering mechanism 44.

As each bottle 1 enters the spotter, it is contacted by one of the rollers 27 carried by a corresponding lever 26. At the same time, a roller 36 on the tensioning arm 36 trailing the next previous lever 26 will contact the bottle and bias it against the leather-covered arcuate edges 11. As the mechanism rotates, a roller 27 will drive each bottle 1 along the edges. The bottles will freely slide on base plate 7, and will initially rotate due to the biasing action of rollers 36 and the friction presented by leather 12. A particular bottle will continue to rotate until its projection 4 comes in contact with the corresponding stop 40, at which time the bottle will cease rotating about its own vertical axis. However, the bottle will continue to travel around the arc until it reaches conveyor 3 and leaves the spotter device.

The spiders are rotated at a constant velocity, with not intermittent movement or dwell necessary to spot the bottles. The nylon or synthane rollers are adapted to make frictionless line contact with the bottles during the operation. Since the rollers rotate freely, they rotate with a bottle until the bottle is spotted, and subsequently remain stationary relative to their axes.

Rollers 27 and 36 are positioned vertically between plates 8 and 9 to provide for vertical stability of the bottles, no head grippers or the like being necessary. Bottle breakage is thereby reduced to a minimum.

The spotting device indexes a plurality of successive-moving objects being transferred to orient the same to a predetermined angular position as they continue on their course of transfer, and utilizes a continuous rotary motion and a positive acting stop mechanism. The device is adapted to accommodate objects of varying shapes and dimensions with little readjustment being necessary. Mis-indexing and breakage are substantially reduced, and the apparatus will operate equally well at low or high speeds.

By orientating the bottles as described, all stamps, labels and seals may be applied thereto in a predetermined relation to each other.

Various modes of carrying out the invention are contemplated as within the scope of the following claims particularly pointing out and distinctly claiming the subject matter which is regarded as the invention.

We claim:

1. In a spotting device for indexing a plurality of successive moving objects during transfer to orient the same to a predetermined angular position as they continue on their transfer course, and wherein the successive objects are moved along an arcuate path and biased into engagement with an arcuate rail frictionally turning the objects upon their own axes to orient the same and wherein the successive objects are moved by a rotary member disposed concentrically relative to the arcuate rail and having means thereon for engaging spotting means on the objects determining a predetermined desired orientation of the objects, a rotary member comprising a vertical rotary post, a hub mounted thereon for rotation therewith, a spider carried by said hub for rotation therewith, a plurality of bell crank levers pivoted in circumferentially spaced relation to the outer ends of the arms of the spider and carrying object engaging rollers and spotting means, a ring gear mounted concentrically on said spider for rotational adjustment relative thereto, a segment gear on the inner end of each said bell crank lever meshing with said ring gear, and means carried by said spider to rotationally adjust and secure said ring gear in selected position, whereby said object engaging rollers may accommodate objects of different sizes.

2. A spotting device as defined by claim 1 including a flange on said hub spaced vertically from said spider and separate means extending through said flange and into threaded engagement with said spider to support the spider at selected adjustable heights from said flange.

3. In a spotting device for indexing a plurality of successive moving objects during transfer to orient the same to a predetermined angular position as they continue on their transfer course, and wherein the successive objects are moved along an arcuate path and biased into engagement with an arcuate rail frictionally turning the objects upon their own axes to orient the same and wherein the successive objects are moved by a rotary member disposed concentrically relative to the arcuate rail and having means thereon for engaging spotting means on the object determining a predetermined desired orientation of the objects, a rotary member comprising a vertical rotary post, a hub mounted thereon for rotation therewith, first and second vertically spaced spiders carried by said hub for rotation therewith, a plurality of bell crank levers pivoted in circumferentially spaced relation to the outer ends of the arms of said spiders and carrying object engaging rollers and spotting means, first and second ring gears mounted concentrically on said first and second spiders respectively for rotational adjustment relative thereto, a segment gear on the inner end of each said bell crank levers meshing with the respective ring gear and means carried by said spiders to rotationally adjust and secure said ring gears in selected position, whereby said object engaging rollers may accommodate objects of different sizes.

4. A spotting device as defined by claim 3 including a flange on said hub spaced vertically from said spiders and separate means extending through said flange and into threaded engagement with corresponding spiders to support the spiders at selected adjustable heights from said flange.

References Cited in the file of this patent

UNITED STATES PATENTS

| | | |
|---|---|---|
| 2,106,997 | Fenner | Feb. 1, 1938 |
| 2,115,061 | Darling | Apr. 26, 1938 |
| 2,524,700 | Grant | Oct. 3, 1950 |
| 2,528,912 | Rappaport et al. | Nov. 7, 1950 |